United States Patent [19]

Chmiel et al.

[11] Patent Number: 4,877,761

[45] Date of Patent: Oct. 31, 1989

[54] REFRACTORY COMPOSITION FOR REFRACTORY LININGS OF METALLURGICAL VESSELS

[75] Inventors: Max Chmiel; Rainer Prange, both of Hagen, Fed. Rep. of Germany

[73] Assignee: Dolomitwerke GmbH, Wulfrath, Fed. Rep. of Germany

[21] Appl. No.: 338,385

[22] Filed: Apr. 11, 1989

Related U.S. Application Data

[63] Continuation-in-part of Ser. No. 64,817, Jun. 19, 1987, abandoned.

[30] Foreign Application Priority Data

Jun. 19, 1986 [DE] Fed. Rep. of Germany ....... 3620473

[51] Int. Cl.$^4$ ..................... C04B 35/04; C04B 35/06
[52] U.S. Cl. .................................... 501/109; 501/113; 501/123
[58] Field of Search .................. 501/109, 113, 123

[56] References Cited

U.S. PATENT DOCUMENTS

| | | | |
|---|---|---|---|
| 3,414,419 | 12/1968 | Farrington et al. | 501/109 |
| 3,632,360 | 1/1972 | Lufcy | 501/109 |
| 3,816,146 | 6/1974 | Cassens | 501/109 |
| 4,549,906 | 10/1985 | Wyskott et al. | 501/109 |

FOREIGN PATENT DOCUMENTS

| | | | |
|---|---|---|---|
| 0652138 | 11/1962 | Canada | 501/109 |
| 0087825 | 9/1983 | European Pat. Off. | 501/109 |
| 0139311 | 5/1985 | European Pat. Off. | |
| 1571411 | 2/1970 | Fed. Rep. of Germany | |
| 0096257 | 3/1973 | Fed. Rep. of Germany | |
| 2723792 | 11/1978 | Fed. Rep. of Germany | |
| 2910309 | 9/1980 | Fed. Rep. of Germany | |

OTHER PUBLICATIONS

S. Balke et al., "Ullmanns Encyklopädie der technischen chemie", 1965 pp. 750–755.

*Primary Examiner*—William R. Dixon, Jr.
*Assistant Examiner*—Anthony J. Green
*Attorney, Agent, or Firm*—Collard, Roe & Galgano

[57] ABSTRACT

A refractory composition for use, preferably as a lining of a metallurgical vessel is disclosed. The refractory composition includes sintered oxide granulations, based on magnesium oxide, dolomite, calcium oxide or a combination thereof, an organic binder having a mixture containing carbomethoxy-substituted oligophenyls, carbomethoxy-substituted benzyl esters or a combination thereof, and 0 to 20 parts by weight of a fine particulate carbon carrier per 100 parts by weight sintered oxide. A process for the production of a pressed body employing the refractory composition of the invention is also disclosed.

10 Claims, No Drawings

REFRACTORY COMPOSITION FOR REFRACTORY LININGS OF METALLURGICAL VESSELS

This application is a continuation-in-part of application Ser. No. 064817, filed June 19, 1987 now abandoned.

The present invention relates to a refractory composition for refractory linings of metallurgical vessels. More particularly, the invention relates to a refractory compound comprising:

(a) sintered oxide granulations based on magnesium oxide, dolomite or calcium oxide, or mixtures thereof;
(b) an organic binder; and
(c) 0 to 20 parts by weight of a finely particulate carbon carrier per 100 parts by weight sintered oxide.

For the lining of metallurgical vessels such as, for example, arc furnaces, converters and ladles, pitch-bonded compounds and shaped bodies based on magnesium oxide, dolomite or mixtures thereof are most often used. Shaped bodies produced from pitch-bonded compounds have the drawback that in the course of the first heating, they exhibit a clearly noticeable decrease in strength in the temperature range of from about 200° to 500° C., which may have adverse effects in practical application. During heating, the viscosity of the binder initially decreases. Several proposals have been made to reduce or to completely eliminate the decrease in strength caused by such decrease in viscosity; however, to date, such proposals were afflicted by numerous drawbacks.

According to DE-OS 15 71 411, a temperature treatment of the shaped products can be carried out at temperatures between 200° and 450° C. The drawback of such thermal treatment is that the required tempering time increases greatly at temperatures below 350° C. According to other proposals, compounds promoting coking are added to the pitch-containing mixture, their main function being to initiate polymerization of the pitch already at low temperatures so that its viscosity rises greatly. This reduces the decline in strength in the refractory brick in the lower temperature range. Coking-promoting compounds are sulfur or sulfur-containing compounds, oxidants, such as, for example, inorganic nitrates or organic nitro-compounds, chlorinated aromatics, or Lewis acids such as, for example, $AlCl_3$, $ZnCl_2$. These compounds have the drawback that volatile components or decomposition products are liberated during the heating of the refractory lining. Such components or products can only be collected again and eliminated, without causing pollution, at great cost or expediture. In some cases, undesirable residues remain in the refractory product and adversely influence its durability.

Another possibility of reducing the decline in strength in unburned or unfired, basic bricks is the use of hot-curing synthetic resins or their mixtures with pitch as the binder. However, hot-curing synthetic resins are considerably more expensive as compared to pitch so that their application has to remain limited to few products for cost reasons.

Accordingly, it is an object of the present invention to make available a refractory composition of the type specified above, as well as shaped refractory bodies, for producing refractory linings that exhibit increased resistance to compression under heat, including such resistance at temperatures up to 350° C.

The foregoing and related objects are accomplished by the present invention in that the organic binder of the refractory composition has a content of a mixture containing carbomethoxy-substituted oligophenyls and carbomethoxy-substituted benzyl esters; such mixture being formed as a residue in the production of dimethylterephthalate. It is advantageous if the binder contains from 0.5 to 10 parts by weight of the residue obtained in the preparation of dimethylterephthlate per 100 parts by weight of sintered oxide. Below 0.5 part by weight, the binder cannot develop an adequate effect. If the share is more than 10 parts by weight, not only will the amount of volatile components be disadvantageous, but the composition will also have a consistency that will make further processing more difficult.

According to a further feature of the invention, the composition additionally contains, if necessary, 1.5 to 9.5 parts by weight pitch, bitumen and/or synthetic resins per 100 parts by weight of the total content of refractory oxides and binder, in order to increase the residual carbon content. As additional additives, the composition may contain alcohols and amines, which act as auxiliary wetting agents.

Additionally, the invention relates to the use of the composition of the invention for the production of pressed shaped bodies. Metallurgical vessels can be lined with these so-called "green" bricks without any other finishing treatment. Of course, it is possible to subject these bricks after a shaping step to a thermal treatment of temperatures in the range from 250° to 300° C. (in which treatment the major portion of the volatile components is expelled) or to calcinate the bricks at a temperature above 1200° C.

The invention will now be described in greater detail with reference to the following examples. It should, however, be pointed out that the examples which follow are provided for purposes of illustration only and are not intended to define the scope and limitations of the invention.

EXAMPLES

The examples in the following table were produced with the use of Haldener sintered dolomite, commercial sintered magnesite or sintered lime produced in a semi-technical calcination test. The sintered granulations were produced by crushing and screening. The maximum grain size came to 5 mm diameter in all cases. The sintered material for the fine grain/meal range was ground in a ball crusher and consists of the fraction 0 to 0.3 mm with an about 60% share of smaller than 90 μm.

For increasing the carbon content, commercial flame soot or macrocrystalline natural graphite with 85% carbon and particle sizes of less than 150 μm was used. The binder used in the examples is characterized by the following summary:

| DMT Residue | | |
|---|---|---|
| Softening point (K & S) | (°C.) | 50 |
| Density at 130° C. | (g/cm$^3$) | 1.195 |
| Viscosity at 120° C. | (mPas) | 1000 |
| Coke residue according to Conradson | (%) | 23 |
| Carbomethoxy-substituted oligophenyls | (approx.) | 87% |
| Carbomethoxy-substituted benzyl esthers | (approx.) | 7% |
| Dimethylterephthalate | (approx.) | 2% |
| Benzoic methyl ester | (approx.) | 4% |

DMT Residue
100%

For comparison purposes, refractory compositions containing, as the organic binder, bonding pitch or synthetic resin of the Novolak-type may be used.

The granulations, which may be preheated to 130° C., are mixed with the binder (which was preheated, too) in a forced circulation mixer and initmately blended. Subsequently, the fines were added and blending was continued until the mixture was homogeneous. The resulting hot mixture was immediately processed on an oil-hydraulic press to form or shape normal bricks or formats similar to normal bricks, with application of a compression pressure of 120N/mm².

Test values may be determined for a few examples on the cold green brick. One brick of each example was tempered for 2 hours at 300° C. in a heating cabinet and the test values given in the table were determined thereafter. For the coking test at 1000° C., test specimens were taken from the bricks that were tempered at 300° C.

Test values maybe determined on standard test cylinders sized 50×50 mm, which are drilled from the bricks. The methods of determination for the determination of the apparent (gross) density, cold compressive strength, hot compressive strength and residual carbon should conform to the test methods normally used in the refractory industry.

TABLE
Composition of Refractory Compounds and Properties of Shaped Bodies made therefrom

1. Sintered Oxide Grit Based on Sintered Dolomite

| Example No. | Comparison 1.0 | According to Invention 1.1 | 1.2 | 1.3 |
|---|---|---|---|---|
| Vehicle Share of compound in % | | | | |
| DMT-Residue | — | 4.0 | 4.5 | 1.8 |
| Bonding Tar | 4.5 | — | — | 2.7 |
| Soot Addition in % | — | — | 1.25 | 1.0 |
| Test Values | | | | |
| Bulk Density, g/cm³ | 2.98 | 2.99 | 3.00 | 2.86 |
| CDF, N/mm² | 45.0 | 30.2 | 68.0 | 35.1 |
| WDF, N/mm² | | | | |
| 200° C. | 0.4 | 4.0 | 2.5 | 2.1 |
| 300° C. | 0.4 | 32.8 | 31.0 | 10.2 |
| 400° C. | 1.0 | 22.1 | 44.0 | 10.8 |
| Test Values at 300° C. Tempered Brick | | | | |
| Bulk Density | 2.96 | 2.96 | 2.98 | 2.84 |
| CDF, N/mm² | 39.6 | 23.7 | 67.3 | 34.2 |
| WDF, N/mm² | | | | |
| 200° C. | 0.7 | 20.3 | 55.6 | 13.1 |
| 300° C. | 1.9 | 17.7 | 49.2 | 11.3 |
| 400° C. | 2.7 | 24.3 | 46.7 | 11.0 |
| Test Values after Cooking 1000° C. | | | | |
| Bulk Density, G/cm³ | 2.86 | 2.85 | 2.86 | 2.77 |
| CDF, N/mm² | 32.4 | 20.3 | 56.0 | 36.7 |
| Residual Carbon % | 1.9 | 0.9 | 2.0 | 2.2 |

2. Sintered Oxide Grit Based on Sintered Magnesite

| Example No. | Comparison 2.0 | According to Invention 2.1 | 2.2 | 2.3 |
|---|---|---|---|---|
| Vehicle Share of compound in % | | | | |
| DMT-Residue | — | 3.5 | 2.1 | 1.75 |
| Bonding Tar | 3.5 | — | 1.4 | — |
| Synthetic Resin | — | — | — | 1.75 |
| Soot Addition in % | 2.5 | 2.5 | 2.5 | 2.5 |
| Test Values | | | | |
| Bulk Density, g/cm³ | 3.08 | 3.07 | 3.06 | 3.06 |
| CDF, N/mm² | 45.6 | 60.8 | 59.4 | 60.2 |
| WDF, N/mm² | | | | |
| 200° C. | 1.2 | 3.5 | 2.8 | 10.4 |
| 300° C. | 1.5 | 8.0 | 8.7 | 14.6 |
| 400° C. | 1.4 | 45.2 | 26.3 | 51.8 |
| Test Values at 300° C. Tempered Brick | | | | |
| Bulk Density | 3.06 | 3.05 | 3.04 | 3.08 |
| CDF, N/mm² | 50.4 | 63.2 | 54.2 | 66.6 |
| WDF, N/mm² | | | | |
| 200° C. | 5.9 | 15.1 | 10.3 | 17.6 |
| 300° C. | 2.4 | 12.0 | 9.1 | 15.6 |
| 400° C. | 2.0 | 51.4 | 29.1 | 50.5 |
| Test Values after Cooking 1000° C. | | | | |
| Bulk Density, G/cm³ | 3.00 | 3.00 | 3.00 | 3.03 |
| CDF, N/mm² | 46.6 | 63.6 | 50.4 | 36.2 |
| Residual Carbon % | 4.3 | 3.1 | 3.8 | 3.3 |

3. Sintered Oxide Grit Based on Sintered Magnesite Plus Addition of Graphite

| Example No. | Comparison 3.0 | According to Invention 3.1 |
|---|---|---|
| Vehicle Share of compound in % | | |
| DMT-Residue | — | 4.5 |
| Bonding Tar | 4.5 | — |
| Graphite Addition, in % | 15 | 15 |
| Test Values | | |
| Bulk Density, g/cm³ | 2.93 | 2.94 |
| CDF, N/mm² | 18.2 | 24.6 |
| WDF, N/mm² | | |
| 200° C. | 0.5 | 2.0 |
| 300° C. | 0.3 | 7.0 |
| 400° C. | 0.6 | 8.5 |
| Test Values at 300° C. Tempered Brick | | |
| Bulk Density | 2.94 | 2.96 |
| CDF, N/mm² | 20.3 | 25.3 |
| WDF, N/mm² | | |
| 200° C. | 4.3 | 14.7 |
| 300° C. | 1.2 | 8.2 |
| 400° C. | 2.5 | 10.8 |
| Test Values after Cooking 1000° C. | | |
| Bulk Density, G/cm³ | 2.90 | 2.89 |
| CDF, N/mm² | 25.7 | 32.8 |
| Residual Carbon % | 12.5 | 12.0 |

4. Sintered Oxide Grit Based on Sintered Lime

| Example No. | Comparison 4.0 | According to Invention 4.1 |
|---|---|---|
| Vehicle Share of compound in % | | |
| DMT-Residue | — | 4.5 |
| Bonding Tar | 4.5 | — |
| Sort Addition, in % | | |
| Test Values | | |
| Bulk Density, g/cm³ | 2.70 | 2.72 |
| CDF, N/mm² | 41.3 | 40.6 |
| WDF, N/mm² | | |
| 200° C. | 0.9 | 6.8 |
| 300° C. | 1.2 | 14.6 |
| 400° C. | 1.1 | 20.2 |
| Test Values at 300° C. Tempered Brick | | |
| Bulk Density | 2.69 | 2.67 |
| CDF, N/mm² | 45.7 | 50.5 |
| WDF, N/mm² | | |
| 200° C. | 1.5 | 25.3 |
| 300° C. | 2.6 | 12.6 |
| 400° C. | 2.8 | 20.7 |

TABLE-continued

Composition of Refractory Compounds and Properties of Shaped Bodies made therefrom

| Test Values after Cooking 1000° C. | | |
|---|---|---|
| Bulk Density, G/cm$^3$ | 2.58 | 2.57 |
| CDF, N/mm$^2$ | 25.6 | 22.8 |
| Residual Carbon % | 1.8 | 1.0 |

While only several embodiments and examples of the present invention have been described, it is obvious that many changes and modifications may be made thereunto, without departing from the spirit and scope of the invention.

What is claimed is:

1. A refractory composition for a refractory lining of a metallurgical vessel, consisting essentially of:
    sintered oxide granulations based on a member selected from the group consisting of magnesium oxide, dolomite, calcium oxide and a combination thereof;
    an organic binder consisting essentially of 0.5 to 10% by weight of a mixture selected from the group consisting of carbomethoxy-substituted oligophenyls, carbomethoxy-substituted benzyl esters and a combination thereof which are produced as a residue in the production of dimethylterephthalate; and
    0 to 20 parts by weight of a fine particulate carbon carrier per 100 parts by weight sintered oxide.

2. The refractory composition according to claim 1, further consisting essentially of 1.5 to 9.5 parts by weight of a member selected from the group consisting of pitch, bitumen, a synthetic resin and a combination thereof, per 100 parts by weight of the total content of said sintered oxide granulations and said organic binder.

3. A process for the production of a pressed shaped body, consisting essentially of the steps of:
    employing a refractory composition, said composition including sintered oxide granulations based on a member selected from the group consisting of magnesium oxide, dolomite, calcium oxide and a combination thereof, an organic binder including a mixture containing 0.5 to 10% by weight of a member selected from the group consisting of carbomethoxy-substituted oligophenyls, carbomethoxy-substituted benzyl esters and a combination thereof which are produced as a residue in a production of dimethylterephthalate, and 0 to 20 parts by weight of a fine particulate carbon carrier per 100 parts by weight sintered oxide; and
    pressing said composition into a shaped body.

4. The process according to claim 3, wherein the refractory composition of said employing step further includes 1.5 to 9.5 parts by weight of a member selected from the group consisting of pitch, bitumen, a synthetic resin and a combination thereof, per 100 parts by weight of the total content of said sintered oxide granulations and said organic binder.

5. The process according to claim 3, wherein the refractory composition of said employing step further includes an alcohol.

6. The process according to claim 3, wherein the refractory composition of said employing step further includes an amine.

7. The process according to claim 3, further comprising the step of:
    temperature treating said shaped body at a temperature of 250° to 300° C.

8. The process according to claim 3, further comprising the step of:
    temperature treating said shaped body at a temperature of above 1200° C.

9. A process for lining a metallurgical vessel, comprising the step of employing the pressed shaped body produced according to the process of claim 3.

10. The pressed shaped body produced according to the process of claim 3.

* * * * *